United States Patent Office 2,870,184
Patented Jan. 20, 1959

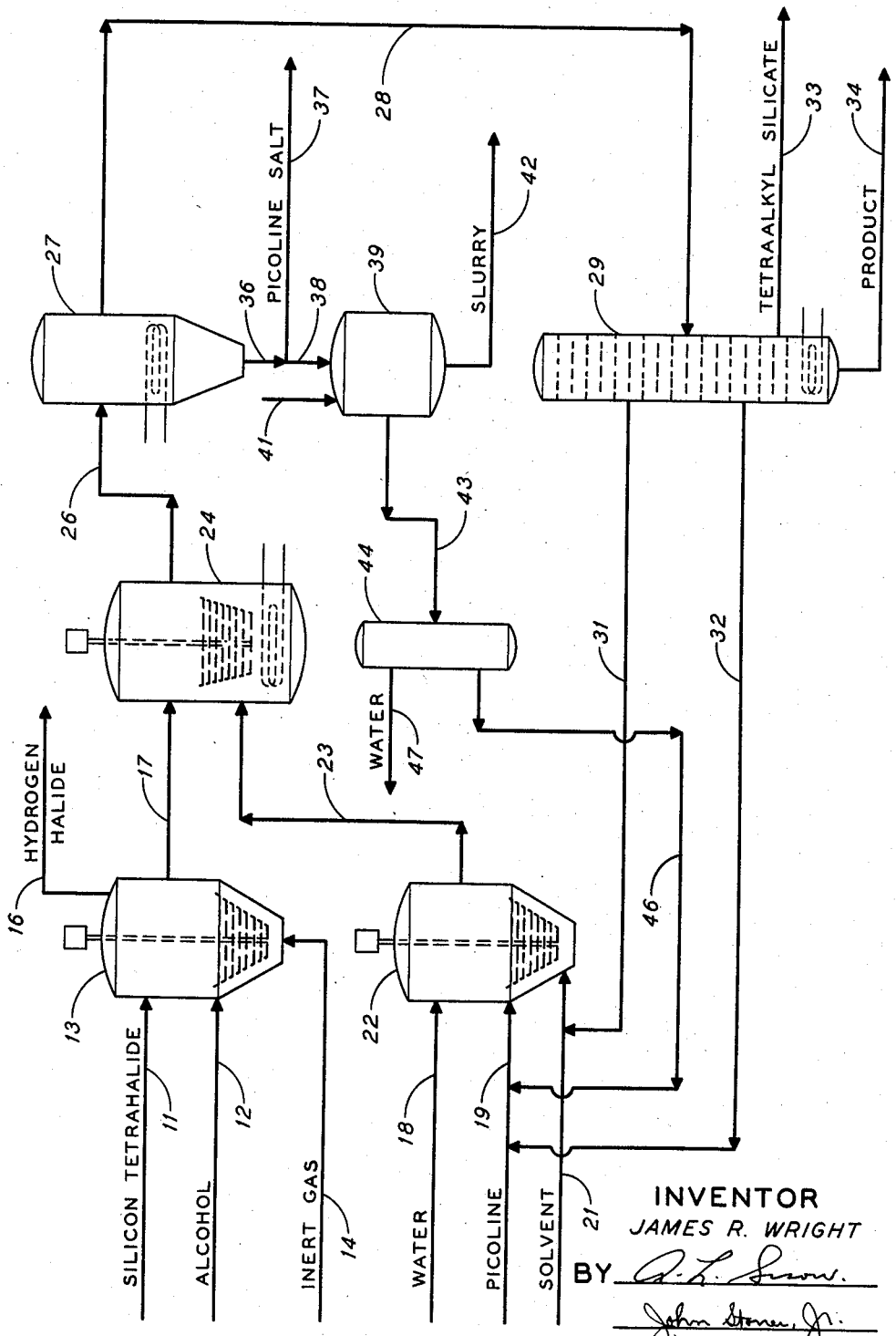

2,870,184
PROCESS FOR MAKING POLY 2-ETHYLBUTOXY-
SILOXANES

James R. Wright, El Cerrito, Calif., assignor to California Research Corporation, San Francisco, Calif., a corporation of Delaware Application September 30, 1954, Serial No. 459,448

3 Claims. (Cl. 260—448.8)

This invention relates to the production of polysiloxanes. More particularly, the invention is directed to a new and improved process for preparing polyalkoxypolysiloxanes and novel mixtures derived thereby having superior properties as hydraulic base fluids and lubricants for special applications.

Polyalkoxypolysiloxanes in general are excellent hydraulic base fluids and synthetic lubricants for purposes such as the lubrication of instruments, aircraft gas turbines and ice machines. They are superior to the silicones in that they provide good steel-on-steel lubrication, whereas the silicones are such poor lubricants for these types of applications that serious welding and tearing result at ordinary loads. Orthosilicates have been prepared which are better than silicones insofar as their ability to lubricate steel surfaces is concerned, but their viscosity-temperature relationships are generally less satisfactory than those of either the silicones or polyalkoxypolysiloxanes.

These polyalkoxypolysiloxanes, as illustrated by the hexa-alkoxydisiloxanes, may be prepared by the reaction of silicon tetrachloride with alcohol to produce the corresponding trialkoxychlorosilane which is then reacted with water in the presence of an acid acceptor such as pyridine to give the hexa-alkoxydisiloxane and hydrogen chloride salt of pyridine in solid form. Methods of preparing the polyalkoxypolysiloxanes such as this are completely unsatisfactory for any production above laboratory scale. Separation of the solid hydrogen chloride salt of the acid acceptor is troublesome as well as expensive to carry out and renders the process commercially impracticable. Furthermore, the yield of polyalkoxypolysiloxanes by such methods is substantially reduced by occlusion of the product on the solid acid acceptor salt. Any attempt to increase the yield through washing of the salt gives rise to emulsion problems which will vary from batch to batch and are difficult to resolve in commercial practice. The quality of the polyalkoxypolysiloxanes produced by methods such as these is also affected, since traces of water will cause hydrolysis of the product and quality control, as, for example, viscosity, is exceedingly difficult.

I have now found that a novel mixture of polyalkoxypolysiloxanes of the type described above having improved properties may be advantageously prepared by a new method which comprises reacting an alcohol containing from 1 to 16 carbon atoms with a silicon tetrahalide to form a mixture of alkoxyhalosilanes, the molar ratio of alcohol to silicon tetrahalide being more than 2:1 but less than 4:1, removing hydrogen halide formed in the reaction, reacting said mixture of alkoxyhalosilanes with water in the presence of picoline, said water and picoline being in amounts stoichiometrically equal to the halogen of the alkoxyhalosilanes, and separating the polyalkoxypolysiloxane mixture and liquid picoline hydrohalide salt formed in the reaction.

The improved new mixtures of polyalkoxypolysiloxanes of the invention are predominantly hexa-alkoxydisiloxanes, but contain in addition minor amounts of orthosilicates and higher polyalkoxypolysiloxanes. They are unique in that they possess superior viscosity-temperature characteristics and greater hydrolytic stability compared to either the corresponding orthosilicates or hexa-alkoxydisiloxanes.

The present process, as stated above, is distinctly advantageous in that it involves no solid acid acceptor salt which would be difficult to separate. The yields of polyalkoxypolysiloxane product are greatly enhanced, since its occlusion on the solid salt is avoided. Washing of the solid salt to remove occluded product is likewise unnecessary. Thus, no troublesome emulsions result as in other processes.

The reactants and reaction conditions of the process in accordance with this invention are as briefly described below.

The alkyl alcohol may contain from 1 to 16 carbon atoms, but preferably contains from 2 to 10 carbon atoms. It may be straight or branched-chain in nature, with the branched-chain alcohol being preferred for the hydrolytic stability of the polyalkoxypolysiloxane derived from it. Primary and secondary alcohols are most satisfactory, because tertiary alcohols are inclined to react with the hydrogen chloride formed in the reaction and thus dehydrate. Mixtures of alcohols within the aforementioned description may also be employed to give polyalkoxypolysiloxanes having mixed alkoxy radicals.

The silicon tetrahalide may be either silicon tetrachloride, silicon tetrabromide or silicon tetra-iodide, but silicon tetrachloride is preferred for its present availability. The picoline acid acceptor is commercially available and may be either α-picoline or β-picoline. Any of these methyl pyridines are suitable, but α-picoline is preferred, since it is easy to obtain and produces a readily liquefiable hydrohalide salt. It has the further advantage that its hydrogen halide salt super-cools over a considerable temperature range, that is, from about 71° C. down to 60° C. before solidifying.

The reaction proceeds in a straightforward manner, and it is essential only that the picoline hydrohalide salt be maintained in liquid form as stated above. This is simply done by carrying out the separation phase of the process at temperatures above the melting point of the picoline hydrohalide salt, that is, above about 71° C. in the case of α-picoline.

In the initial phase of the reaction it is desirable to react the alcohol and the silicon tetrahalide at low temperatures, for example, below 0° C. Such temperatures may be conveniently effected by cooling and/or controlling the rate at which the alcohol and silicon tetrachloride are brought into contact. Temperatures from −20 to −10° C. are preferred, since they decrease the amount of orthosilicate formed in the reaction.

In the second phase of the process, the hydrolysis and neutralization step, moderate temperatures of from 0 to 100° C. are preferable for economy and ease of operation, although in some cases it may be considered desirable to employ temperatures as low as −10° C. or as high as 250° C. to facilitate hydrolysis and neutralization. For the salt separation step, the temperatures usually are above 70° C., since the picoline hydrohalide salts are normally liquid at these temperatures. Preferred temperatures are those from 70 to 250° C., since they are easy to maintain with conventional equipment and do not result in decomposition of the products.

The pressures are atmospheric for economic reasons, but either sub-atmospheric or super-atmospheric pressures may be employed when desired for special reasons, as, for example, in the conservation of low-boiling solvents in the reaction, such as benzene, which boils at 80° C.

The rate of reaction in the first phase of the process is preferably regulated so that the reaction temperature does not exceed −10° C. In the first and second phases of the process the reaction is complete when hydrogen halide is no longer evolved. This usually requires from about 2 to 10 hours.

The molar ratio of alcohol to silicon tetrahalide, as already mentioned, is greater than 2:1 but less than 4:1, with molar ratios of 2.5:1 to 3.5:1 presently preferred for the superior product thus produced. Molar ratios of trialkoxychlorosilane to dialkoxydichlorosilane in the intermediate may range from 9:1 to 1:1, but proportions of 5:1 to 1.5:1, or, more particularly, about 3:1 are preferred for products unusually stable to hydrolysis. The amount of water and the amount of picoline reacted are each stoichiometrically equal to the halogen in the alkoxyhalosilane intermediate produced in the first phase of the reaction. Although excess picoline may be employed to insure complete neutralization, it is desirable that the amount of water closely approximate the theoretical amount necessary to hydrolyze the halogen of the alkoxyhalosiloxane. Amounts of water equal to about 80 to 110% of theory are usually preferred, since the emulsions encountered in the process when a great excess of water is present are thus avoided. The theoretical amounts of water and picoline required are readily determined by analyzing the intermediate alkoxyhalosiloxane product for halogen.

Restated in terms of the chemistry involved rather than physical conditions, the reactions of the process of the invention as described above may, for the purpose of illustration, be said to occur in the main part in two distinct phases, exclusive of the separation step.

In the first phase of the reaction as described above, the alkyl alcohol is reacted with silicon tetrahalide to give hydrogen halide and a mixed alkoxyhalosilane intermediate including alkoxytrihalosilane, dialkoxydihalosilane, trialkoxyhalosilane, tetraalkoxysilane or orthosilicate and some condensed organo-silicon compounds of indeterminate structure.

The various chemical reactions in this phase by which the different intermediates are formed may be conveniently illustrated by the following equations in which R is an alkyl group of 1 to 16 carbon atoms and X is a halogen.

(1) $1SiX_4 + 1ROH \rightarrow ROSiX_3 + HX$
(2) $1SiX_4 + 2ROH \rightarrow (RO)_2SiX_2 + 2HX$
(3) $1SiX_4 + 3ROH \rightarrow (RO)_3SiX + 3HX$
(4) $1SiX_4 + 4ROH \rightarrow (RO)_4Si + 4HX$ In the above reactions the dialkoxydihalosilane and trialkoxyhalosilane are produce predominantly, and only minor amounts of the other products result, usually from 5 to 35% by weight of the mixed products.

In the second phase of the process the mixed alkoxyhalosilane intermediate obtained in the first phase, as just illustrated, is reacted with water in the presence of picoline. The alkoxyhalosilanes are hydrolyzed by the water and become linked to the oxygen while releasing hydrogen halide. The different chemical reactions of this stage may be illustrated by the following equations:

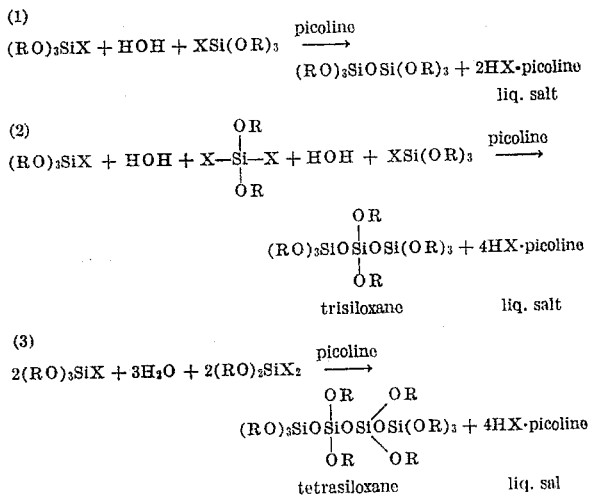

R and X are the same as previously mentioned. From these equations it may be seen that the proportions of octa-alkoxytrisiloxanes and higher polyalkoxypolysiloxanes occurring in the reaction product will depend on the proportions of dialkoxydihalosilane in the mixed alkoxyhalosilane intermediate from the first phase of the reaction as illustrated above. This proportion is controlled in the initial phase of the reaction by adjusting the molar ratio of alcohol to silicon tetrahalide, as already stated.

As further illustrations of the invention, the following examples are submitted. Unless otherwise specified, the proportions are on a weight basis.

EXAMPLE 1

To a dry, nitrogen-swept, two-liter flask equipped with condenser, stirrer, dropping funnel and low temperature thermometer, three (3.0) moles of SiCl₄ (510) grams was charged. This was cooled to −18° C. To the SiCl₄ was added 9.6 moles (979.2 grams) of 2-ethylbutanol over a three-hour period. The temperature ranged from −20° C. to −10° C. The product was allowed to come to 10° C. in two hours, during which time nitrogen was passed through the reaction mixture to remove dissolved HCl.

An analysis for total chlorine in the product obtained above was made and found to be 8.1%. From this the quantity of water required for hydrolysis was calculated. A mixture fo 750 cc. of benzene, 3 moles (289 grams) of α-picoline and 1.25 moles (22.6 grams) of water was added over a two-hour period to the crude alkoxychlorosilane. The temperature was then raised to 65° C. and maintained for two hours.

The cooled polyalkoxypolysiloxane product was decanted from the salt, stripped of solvent and fractionated in a spinning band column at a reflux ratio of 20:1 under 0.1 mm. pressure. The results of this fractionation are tabulated below:

Table I

| Compound | B. P., °C./0.1 mm. | Percent Yield [1] | Hydrolytic Stability, Hours to Decompose |
|---|---|---|---|
| 2-ethylbutyl silicate | 146–148 | 16 | 75 |
| Hexa(2-ethylbutoxy)-disiloxane | 192–199 | 64 | 96 |
| Octa(2-ethylbutoxy)-trisiloxane | 243–247 | 8 | 126 |
| Heavier distillate | to 263 | 1 | |
| Bottoms | | 7 | |

[1] Based on SiCl₄.

EXAMPLE 2

A clean kettle provided with temperature control and stirring means and vented through a drying tube was cooled to −12° C. During the cooling dry nitrogen was swept through the system. To the kettle was charged 2180 pounds of silicon tetrachloride. 3940 pounds of dry 2-ethylbutanol was added at such a rate that the temperature of the reaction mixture was maintained between −20° C. and −10° C. The addition rate was usually between 3 to 4 pounds per minute. Following the addition of the 2-ethylbutanol, cooling was discontinued, and the reaction mixture was agitated for approximately three hours. Dry nitrogen was passed to the system to facilitate removal of HCl and to promote mixing of the reactants. The 2-ethylbutoxychlorosilane product thus obtained had a mole ratio of tri(2-ethylbutoxy)chlorosilane to di(2-ethylbutoxy)dichlorosilane of between about 9:1 and 1.5:1.

The mixed alkoxychlorosilane intermediate obtained above was then combined with a mixture of about 1300 pounds of α-picoline, 80 gallons of benzene and 92.5 pounds of distilled water at such a rate that the reaction temperature did not exceed about 15° C. This was about 3 to 4 pounds per minute. Following the addition of the benzene-picoline-water mixture, the temperature of the reaction was raised to about 50° C. and held there for about two hours. The temperature was then raised to 80° C. where it was maintained for an additional two hours.

The liquid α-picoline hydrogen chloride salt was decanted from the poly(2-ethylbutoxy)polysiloxane mixture obtained above. The mixture was stripped with the acid of nitrogen at a reduced pressure equal to about 50 mm. of mercury to distill off benzene and excess picoline at a moderate rate. Following this, the solvent-free mixture was stripped at 225° C. (still temperature) at less than 5 mm., until all tetra(2-ethylbutyl)silicate was removed. The residue was a poly(2-ethylbutoxy)polysiloxane mixture possessing excellent stability in the presence of water and a desirably flat viscosity-temperature curve.

In the following examples the initial phase of the process in which the silicon tetrahalide is reacted with alkyl alcohol to form a mixture of alkoxyhalosilane intermediates was omitted for convenience, and the effect of various mixtures of alkoxyhalosilanes in the second phase or stage of the process was studied by reacting different mixtures of trialkoxychlorosilane and dialkoxydichlorosilane in the presence of water and picoline.

EXAMPLE 3

In 250 ccs. of benzene 0.9 mole (33.0 grams) of tri(2-ethylbutoxy)chlorosilane was mixed with 0.1 mole (30.1 grams) of di(2-ethylbutoxy)dichlorosilane and cooled to 10° C. in a two-liter reaction flask equipped with mechanical stirrer, reflux condenser and dropping funnel. To this there was added over a 1.5-hour period a mixture of 1.1 moles (19.8 grams) of water in 1.5 moles of α-picoline. The reaction mixture was then warmed to 66° C. for two hours to complete the reaction. The product was decanted from the α-picoline·HCl and the solvent was removed at reduced pressure. The resultant fluid was then stripped to an overhead temperature of 205° C. at 1.0 mm. pressure in a spinning band column using 20:1 reflux ratio.

EXAMPLE 4

Together with 0.1 mole (9.3 grams) of α-picoline and 250 ccs. of toluene was mixed 0.05 mole (18.3 grams) of tri(2-ethylbutoxy)chlorosilane and 0.05 mole (15.05 grams) of di(2-ethylbutoxy)dichlorosilane. This was charged to a one-liter reaction flask equipped with dropping funnel, condenser and mechanical stirrer and cooled to 10° C. A mixture of 0.4 mole (37.2 grams) of α-picoline and 0.1 mole (1.8 grams) of water was added dropwise with stirring over a one-fourth hour period. This was allowed to stir for 1¼ hours. At the end of this period, 0.4 mole (146 grams) of tri(2-ethylbutoxy)chlorosilane in 250 ccs. of toluene was added to the reaction product. This was followed by the dropwise addition of 0.4 mole (7.2 grams) of water in one mole (93 grams) of α-picoline. The temperature was kept at 10° C. The temperature was raised to 65° C. for two hours to complete the reaction. The product was decanted from the salt, stripped of solvent and topped to 205° C. overhead temperature at 1.0 mm. pressure in a spinning band column at 20:1 reflux ratio.

EXAMPLE 5

To a dry, nitrogen swept, two-liter reaction flask equipped with condenser, stirrer, dropping funnel, and low temperature thermometer, one mole (169.9 grams) of silicon tetrachloride was charged. This was cooled to 18° C. To the SiCl$_4$ was added 2.75 moles (281 grams) of 2-ethylbutanol over a 2.5-hour period. Temperature ranged from −25° to −15° C. The product was allowed to come to 10° C. in two hours, during which time nitrogen was passed through the reaction mixture to remove dissolved HCl. An analysis for total chlorine was then made, and the quantity of water required for hydrolysis was calculated. A mixture of 500 ccs. of toluene, 3 moles (289 grams) of α-picoline and 0.625 mole (13.5 grams) of water was added over 1½ hours to the crude alkoxychlorosilane. The temperature was then raised to 65° C. and maintained for two hours. The product was decanted from the salt, stripped of solvent and topped to 207° C. at 1.0 mm. in a spinning band column.

Various products prepared according to the above procedures containing different ratios of trialkoxychlorosilane were tested for their physical properties. In these tests the viscosities at various temperatures and ASTM slope were determined.

The hydrolytic stabilities of the products were also determined by combining 3 ml. portions of the polyalkoxypolysiloxane to be tested with 3 ml. of distilled water in a small glass vial equipped with a reflux condenser. A ¼ inch piece of clean copper wire was added as catalyst. The vial and contents were placed on a hot plate where they were heated to 212° F. and maintained at that temperature for the duration of the test. Progressive decomposition stages were evidenced by (1) haze formation, (2) formation of precipitate and (3) gel formation. The time in hours required for decomposition of either the aqueous or silicate phase was noted and is reported below.

*Table II*

| Reactants (Mole Percent) | | Viscosity, cs. at ° F. | | | | ASTM Slope | | Hydrolytic Stability |
|---|---|---|---|---|---|---|---|---|
| (RO)$_3$SiCl | (RO)$_2$SiCl$_2$ | −65 | −40 | 100 | 210 | −65/210° F. | 100/210° F. | |
| 100 | ---------- | 588 | 192 | 9.42 | 3.41 | 0.57 | 0.56 | 72 |
| 90 | 10 | 804 | 264 | 11.9 | 4.19 | 0.54 | 0.53 | 77 |
| 75 | 25 | 1,162 | 360 | 15.1 | 5.13 | 0.52 | 0.51 | 216 |
| 60 | 40 | 2,086 | 602 | 20.9 | 6.72 | 0.52 | 0.47 | 96 |

R=2-ethylbutyl.

Similar tests were also carried out on various products to determine the effect of different ratios of alcohol to silicon tetrahalide in the initial phase of the reaction as illustrated by the above examples.

Table III

| Reactants (Mole Percent) | | Viscosity, cs. at ° F. | | | | ASTM Slope | | Hydrolytic Stability |
|---|---|---|---|---|---|---|---|---|
| ROH | SiCl₄ | −65 | −40 | 100 | 210 | −65/210 °F. | 100/210 °F. | |
| 3.2 | 1 | 943 | 300 | 13.1 | 4.61 | 0.54 | 0.51 | 93 |
| 3.0 | 1 | 1,148 | 354 | 14.5 | 4.90 | 0.53 | 0.51 | 113 |
| 2.75 | 1 | 1,966 | 597 | 20.7 | 6.68 | 0.50 | 0.48 | 115 |
| 2.70 | 1 | 2,623 | 868 | 24.4 | 7.65 | 0.49 | 0.47 | 113 |
| 2.50 | 1 | 3,613 | 996 | 28.8 | 8.73 | 0.48 | 0.45 | 113 |

R=ethylbutyl.

From the above test results it is readily apparent that the mixtures of polyalkoxypolysiloxanes according to this invention possess superior properties compared to the pure hexa-alkoxydisiloxanes of the same type alkyl groups. Also shown in the above examples is the fact that mixed polyalkoxypolysiloxanes prepared by the reaction of tri-alkoxy chlorosilanes with dialkoxydichlorosilanes in 3 : 1 molar ratio possess distinctly improved hydrolytic stability over not only pure hexa-alkoxydisiloxanes but over other mixed polyalkoxypolysiloxanes. Since the hexa-alkoxydisiloxanes are generally considered to possess unusually good physical properties such as viscosity-temperature relationships and hydrolytic stability, it is all the more surprising that the mixed polyalkoxypolysiloxanes of this invention produced in accordance with the present improved process should possess still better properties.

In the above examples batch process techniques were employed. In such methods the present process has a distinct advantage in that only a single reaction vessel is required, as distinguished from other processes in which the reaction mixture must be removed and the solid hydrogen chloride salt of the acid acceptor separated in other vessels by processes involving steps such as washing of occluded product from the salt and dissolution of the salt, all of which lead to undesirable formation of emulsions.

In still further illustration of the invention, the improved polyalkoxypolysiloxanes are produced in a continuous type process wherein excess materials are recovered and recycled to the reaction. A schematic flow diagram of such a process is shown in the accompanying drawing.

Referring to the diagram, silicon tetrahalide and alkyl alcohol are introduced through lines 11 and 12, respectively, into reactor vessel 13 for the initial phase of the reaction according to the process of the invention. The reactor vessel is equipped with stirring means and an inert gas such as nitrogen is introduced via line 14 to assist in the agitation as well as to facilitate the removal of gaseous by-products such as hydrogen halide which are vented through line 16. Products of the initial phase of the reaction which are predominantly trialkoxyhalosilane and dialkoxydihalosilane with some mono-alkoxytrihalosilane and orthosilicate are withdrawn via line 17.

Water, picoline and a solvent such as benzene are introduced via lines 18, 19 and 21, respectively, into mixing vessel 22 which is equipped with stirring means. The mixed materials are withdrawn through line 23 to reactor vessel 24 where they are combined and the water reacted with the polyalkoxypolysiloxanes from line 17.

Following the reaction, the polyalkoxypolysiloxane containing reaction mixture is withdrawn from vessel 24 via line 26 and introduced into vessel 27 wherein the liquid polyalkoxypolysiloxane products and hydrogen halide acid acceptor are separated by means such as settling. From separation vessel 27 the polyalkoxypolysiloxane reaction products are transported via line 28 to distillation column 29. Here the polyalkoxypolysiloxane reaction products are distilled and the solvent such as the benzene is withdrawn via line 31 through which it is returned to line 21 and the process as described above. Excess picoline is withdrawn through line 32 from the distillation column and returned via line 19 to the process. Tetra-alkoxysilane or orthosilicate, as it is often called, is withdrawn via line 33 as a by-product of the process and the stripped polyalkoxysiloxane mixture constituting the improved product of the invention is withdrawn through line 34.

The liquid hydrogen halide acid acceptor salt separated in vessel 27 is withdrawn via line 36. This salt may be discarded, if desired, through line 37, but is preferably passed through a recovery stage. In such a recovery stage the liquid hydrogen halide acid acceptor salt is introduced via line 38 to reaction vessel 39. Here the liquid salt is combined with an inorganic base such as sodium hydroxide from line 41 and reacted to give picoline, water and inorganic salts such as sodium halide. The inorganic salt is withdrawn via line 42 in the form of an aqueous slurry. The acid acceptor such as picoline which is released in the reaction is withdrawn through line 43 to dehydrating vessel 44. From dehydrating vessel 44 the dry picoline is returned via line 46 and line 19 to the process, while water is withdrawn through line 47 and discarded.

The fact that the hydrogen halide acid acceptor salt of the present process is separated in liquid form and may be withdrawn from the reaction without occlusion of product involving washing and the attendant emulsion problems as encountered in the separation of solid salts makes it particularly adaptable to continuous type operations as illustrated above.

I claim:

1. A process for preparing improved mixed polyalkoxypolysiloxanes which comprises reacting 2-ethyl butanol with a silicon tetrahalide to form a mixture of alkoxyhalosilanes, the molar ratio of alcohol to silicon tetrahalide being 2.5 : 1 to 3.5 : 1, removing hydrogen halide formed in the reaction, reacting said mixture of alkoxyhalosilanes with water in the presence of picoline, said water being in amounts sufficient to hydrolyze the halogen of the alkoxyhalosiloxanes and said picoline being in amounts sufficient to neutralize the halogen of the alkoxyhalosilanes, and separating the polyalkoxypolysiloxane mixture and liquid picoline hydrohalide salt formed in the reaction.

2. A process for preparing improved mixed polyalkoxypolysiloxanes which comprises reacting 2-ethyl butanol with silicon tetrachloride to form a mixture of alkoxychlorosilanes, the molar ratio of alcohol to silicon tetrachloride being 2.5 : 1 to 3.5 : 1, removing hydrogen chloride formed in the reaction, reacting said mixture of alkoxychlorosilanes with water in the presence of α-picoline, said water being in amounts sufficient to hydrolyze the chlorine of the alkoxychlorosilane and said picoline being in amounts sufficient to neutralize the chlorine of the alkoxychlorosilanes, and separating the polyalkoxypolysiloxane mixture and liquid picoline hydrochloride salt formed in the reaction.

3. A process for preparing improved mixtures of polyalkoxypolysiloxanes which comprises reacting 9.6 moles of 2-ethyl butanol with 3.0 moles of silicon tetrachloride at a temperature of from −20° C. to −10° C. to form a mixture of 2-ethylbutoxychlorosilanes, passing nitrogen through the reaction mixture to remove hydrogen chloride formed in the reaction, reacting said mixture of 2-ethylbutoxychlorosilanes with 1.24 moles of water in the presence of 3 moles of α-picoline and separating the poly-2-ethylbutoxypolysiloxane mixture and picoline hydrochloride salt formed in the reaction.

References Cited in the file of this patent

UNITED STATES PATENTS

| | | |
|---|---|---|
| 2,114,866 | Vaughn | Apr. 19, 1938 |
| 2,547,944 | Iler | Apr. 10, 1951 |
| 2,698,836 | Morrell | Jan. 4, 1955 |
| 2,711,418 | Kather et al. | June 21, 1955 |
| 2,758,127 | Goldschmidt et al. | Aug. 7, 1956 |

OTHER REFERENCES

Post: The Chemistry of the Aliphatic Orthoesters, Reinhold, 1943, pp. 120–121.

Morgan et al.: Jour. Amer. Chem. Soc., vol. 73, November 1951, pp. 5193–5195.